US012756705B2

(12) United States Patent
Yan et al.

(10) Patent No.: US 12,756,705 B2
(45) Date of Patent: Oct. 6, 2026

(54) SERVICE PROCESSING METHOD AND APPARATUS, ELECTRONIC DEVICE, AND STORAGE MEDIUM

(71) Applicant: ZTE CORPORATION, Shenzhen (CN)

(72) Inventors: Xincheng Yan, Shenzhen (CN); Zhenwu Hao, Shenzhen (CN); Yu Ma, Shenzhen (CN); Bo Yang, Shenzhen (CN); Na Zhou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 155 days.

(21) Appl. No.: 18/258,421

(22) PCT Filed: Dec. 6, 2021

(86) PCT No.: PCT/CN2021/135842
§ 371 (c)(1),
(2) Date: Jun. 20, 2023

(87) PCT Pub. No.: WO2022/135132
PCT Pub. Date: Jun. 30, 2022

(65) Prior Publication Data

US 2024/0039913 A1 Feb. 1, 2024

(30) Foreign Application Priority Data

Dec. 21, 2020 (CN) ........................ 202011520804.6

(51) Int. Cl.
*H04L 9/40* (2022.01)

(52) U.S. Cl.
CPC ........ *H04L 63/0876* (2013.01); *H04L 63/107* (2013.01)

(58) Field of Classification Search
None
See application file for complete search history.

(56) References Cited

U.S. PATENT DOCUMENTS 8,054,799 B2 * 11/2011 Sridhar ................ H04W 36/02 455/436
8,898,334 B2 * 11/2014 Hu .......................... H04L 45/04 709/238

(Continued)

FOREIGN PATENT DOCUMENTS

CN 102025702 A 4/2011
CN 102638473 A 8/2012

(Continued)

OTHER PUBLICATIONS

International Searching Authority. International Search Report and Written Opinion for PCT Application No. PCT/CN2021/135842 and English translation, mailed Feb. 25, 2022, pp. 1-10.

(Continued)

*Primary Examiner* — Michael W Chao
(74) *Attorney, Agent, or Firm* — Vivacqua Crane, PLLC

(57) ABSTRACT

A service processing method and apparatus, a device, and a storage medium are disclosed. In the method, network communication such as network identification, service authorization, and service processing is performed by separating network identifiers and location identifiers of a client (110) and a server (210) and establishing a mapping relationship between the network identifiers and the location identifiers of the client and the server.

8 Claims, 6 Drawing Sheets

(56) References Cited

U.S. PATENT DOCUMENTS

| | | | | |
|---|---|---|---|---|
| 9,686,256 | B2 * | 6/2017 | Yan | H04M 3/42263 |
| 2002/0178118 | A1 * | 11/2002 | Hamilton | H04M 15/68 705/40 |
| 2003/0157926 | A1 * | 8/2003 | Ala-Laurila | H04M 15/48 455/406 |
| 2008/0052773 | A1 * | 2/2008 | Samprathi | H04L 63/105 726/13 |
| 2011/0261800 | A1 * | 10/2011 | You | H04W 8/12 370/338 |
| 2011/0302627 | A1 | 12/2011 | Blom et al. | |
| 2012/0176936 | A1 * | 7/2012 | Wu | H04L 61/103 370/254 |
| 2012/0201224 | A1 * | 8/2012 | Wu | H04W 8/00 370/331 |
| 2012/0207137 | A1 * | 8/2012 | Zhou | H04W 12/08 370/331 |
| 2013/0150072 | A1 * | 6/2013 | Kapoor | H04W 4/025 455/456.1 |
| 2013/0262672 | A1 * | 10/2013 | Sun | H04L 41/12 709/224 |
| 2014/0016635 | A1 * | 1/2014 | Kano | H04L 45/72 370/389 |
| 2014/0177513 | A1 * | 6/2014 | Balasubramanian | H04L 12/413 370/315 |
| 2016/0150094 | A1 | 5/2016 | Mandanapu | |
| 2018/0343236 | A1 * | 11/2018 | Pillay-Esnault | H04L 63/20 |
| 2020/0044892 | A1 * | 2/2020 | Allan | H04W 8/08 |
| 2021/0218585 | A1 | 7/2021 | Zhu et al. | |
| 2026/0039667 | A1 * | 2/2026 | Khaund | H04L 63/10 |

FOREIGN PATENT DOCUMENTS

| | | | |
|---|---|---|---|
| CN | 110972092 | A | 4/2020 |
| WO | 2018126483 | A1 | 7/2018 |
| WO | 2020248888 | A1 | 12/2020 |

OTHER PUBLICATIONS

European Patent Office. Partial Supplementary European Search Report for EP Application No. 21909129.5, mailed Apr. 29, 2024, pp. 1-14.

The State Intellectual Property Office of People's Republic of China. First Office Action and Search Report for CN Application No. 202011520804.6 and English translation, mailed Jun. 4, 2026, pp. 1-35.

* cited by examiner

SERVICE PROCESSING METHOD AND APPARATUS, ELECTRONIC DEVICE, AND STORAGE MEDIUM

CROSS-REFERENCE TO RELATED APPLICATION

This application is a national stage filing under 35 U.S.C. § 371 of international application number PCT/CN2021/135842, filed Dec. 6, 2021, which claims priority to Chinese patent application No. 202011520804.6 filed Dec. 21, 2020. The contents of these applications are incorporated herein by reference in their entirety.

TECHNICAL FIELD

The present disclosure relates to the technical field of communication, and in particular, to a service processing method and apparatus, an electronic device, and a storage medium.

BACKGROUND

The Internet uses an Internet Protocol (IP) address as a unified communication identifier. The IP address is ambiguous, and not only represents a network identifier of a host, but also represents a location of the host. Therefore, the IP address is easily acquired and analyzed during service processing, threatening the network security.

SUMMARY

A main objective of embodiments of the present disclosure is to provide a service processing method and apparatus, an electronic device, and a storage medium.

In accordance with a first aspect of the present disclosure, an embodiment provides a service processing method. The method may include: accessing a first gateway for identity identification based on a user identifier (UID); requesting a first client network identifier (NID) from the first gateway; receiving the first client network identifier NID; sending a service authorization request carrying a service identifier (SID) to be accessed and the first client network identifier NID to a service controller through the first gateway; and receiving a service authorization response carrying a server network identifier NID through the first gateway.

In accordance with a second aspect of the present disclosure, an embodiment provides a service processing method. The method may include: accessing a first gateway for identity identification based on a user identifier UID; requesting a first client network identifier NID from the first gateway; receiving the first client network identifier NID; sending service data carrying a service identifier SID to be accessed and the first client network identifier NID to a server through the first gateway and a second gateway; and receiving responded service data from the server.

In accordance with a third aspect of the present disclosure, an embodiment provides a service processing apparatus. The apparatus may include a client, a first gateway, and a service controller. The client is configured for sending a service authorization request carrying a service identifier SID and a client network identifier NID to the first gateway. The first gateway is configured for configuring a client location identifier LID for the client, and forwarding the service authorization request carrying the service identifier SID, the client network identifier NID, and the client location identifier LID to the service controller. The service controller is configured for returning a service authorization response based on the service authorization request, where the service authorization response carries a server network identifier NID and a server location identifier LID.

In accordance with a fourth aspect of the present disclosure, an embodiment provides a service processing apparatus. The apparatus may include a client, a first gateway, a second gateway, and a server. The client is configured for sending service data carrying a client network identifier NID and a server network identifier NID to the first gateway. The first gateway is configured for forwarding the service data carrying the client network identifier NID, a client location identifier LID, the server network identifier NID, and a server location identifier LID to the second gateway. The second gateway is configured for forwarding the service data carrying the client network identifier NID and the server network identifier NID to the server. The server is configured for receiving the service data and sending the responded service data to the client through the second gateway and the first gateway.

Additional features and advantages of the disclosure will be set forth in the description which follows, and in part will be obvious from the description, or may be learned by the practice of the disclosure. The objects and other advantages of the present disclosure can be realized and obtained by the structures particularly pointed out in the description, claims and drawings.

Figure 1:
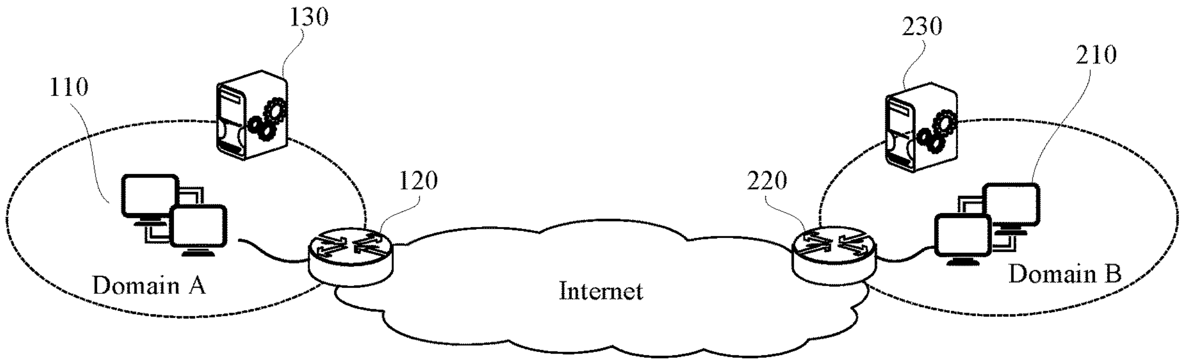
FIG. 1 is a schematic diagram of a network architecture from a client to a server according to an embodiment of the present disclosure.

REFERENCE NUMERALS client 110, first gateway 120, first service controller 130, first identity manager 140, server 210, second gateway 220, second service controller 230, second identity manager 240, third service controller 330.

DETAILED DESCRIPTION

To make the objects, technical solutions, and advantages of the present disclosure clear, the present disclosure is described in further detail in conjunction with accompanying drawings and embodiments. It should be understood that the specific embodiments described herein are merely used for illustrating the present disclosure, and are not intended to limit the present disclosure. The embodiments of the present disclosure and the features in the embodiments may be combined with each other to derive other embodiments not explicitly described.

In the description of the embodiments of the present disclosure, terms such as "module", "component", or "unit" used to denote elements are used for the purpose of facilitating the description of the present disclosure only, and have no particular meanings. Therefore, "module", "component", and "unit" may be used interchangeably.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order. In addition, unless otherwise explicitly defined, the terms such as "configure", "install/mount" and "connect" and the like should be understood in a broad sense, and those having ordinary skills in the art can reasonably determine the specific meanings of the above terms in the embodiments of the present disclosure based on the specific contents of the technical scheme.

The Internet uses an Internet Protocol (IP) address as a unified communication identifier, and hosts are routable. Because the IP address not only represents a network identity of an electronic device, but also represents a location of the electronic device, and the IP address is easily resolved, the exposure of the IP address during network communication threatens the network security. Therefore, on the basis of ensuring the normal provisioning of network services, it is necessary to further strengthen the protection of information such as identities and locations of electronic devices.

In view of the above, the embodiments of the present disclosure provide a service processing method and apparatus, a device, and a storage medium, which can strengthen the protection of information such as identities and locations of electronic devices during network communication, thereby improving the network security.

It should be noted that in some embodiments, the embodiments of the present disclosure are based on a technology of separating identity information from location information. In some other embodiments, the network identity information may further be hidden or dynamically set. A network communication system involved in the embodiments of the present disclosure may be terminal-to-terminal. The terminal may be a client or a server. The terminal-to-terminal may be client-to-client, client-to-server, server-to-server, or clients-to-server(s).

In some embodiments, the electronic device may be a terminal. The terminal may be a client or a server. The client may be a mobile terminal device or a non-mobile terminal device. The mobile terminal device may be a mobile phone, a tablet computer, a notebook computer, a handheld computer, a vehicle-mounted terminal device, a wearable device, a super mobile personal computer, a netbook, a personal digital assistant, etc. The non-mobile terminal device may be a personal computer, a television, a teller machine, a self-service machine, etc. The server may be an independent physical server or a logical entity, which is not limited in the embodiments of the present disclosure. Communication between a client and a server is described below by way of example only.

FIG. 1 shows a network architecture from a client to a server according to the present disclosure. The service processing method and apparatus of the present disclosure can be applied both in a domain and between domains, and service processing (data communication) may be performed both in a domain and between domains (i.e., Internet). In the present disclosure, data communication may be performed in a domain based on a real network identifier NID. Because different domains have different policies for forming network identifiers NIDs, inter-domain communication may also be performed based on a virtual network identifier NID. To further improve the security of network communication, in some embodiments of the present disclosure, inter-domain communication may also be performed based on the virtual network identifier NID or a dynamic network identifier NID, to protect security of information of the client, the server, and the like while ensuring the normal provisioning of services.

As shown in FIG. 1, a network on which a client 110 (i.e., a user's terminal) is located is defined as a domain A, which includes at least a first gateway 120 and a first service controller 130. The client 110 is connected to the first gateway 120. The first gateway 120 is connected to the first service controller 130. The first gateway 120 may further be connected to a second gateway 220. A network on which a server 210 is located is defined as a domain B, which includes at least the second gateway 220 and a second service controller 230. The server 210 is connected to the second gateway 220. The second gateway 220 is connected to the second service controller 230. The second gateway 220 may further be connected to the first gateway 120.

Figure 2:
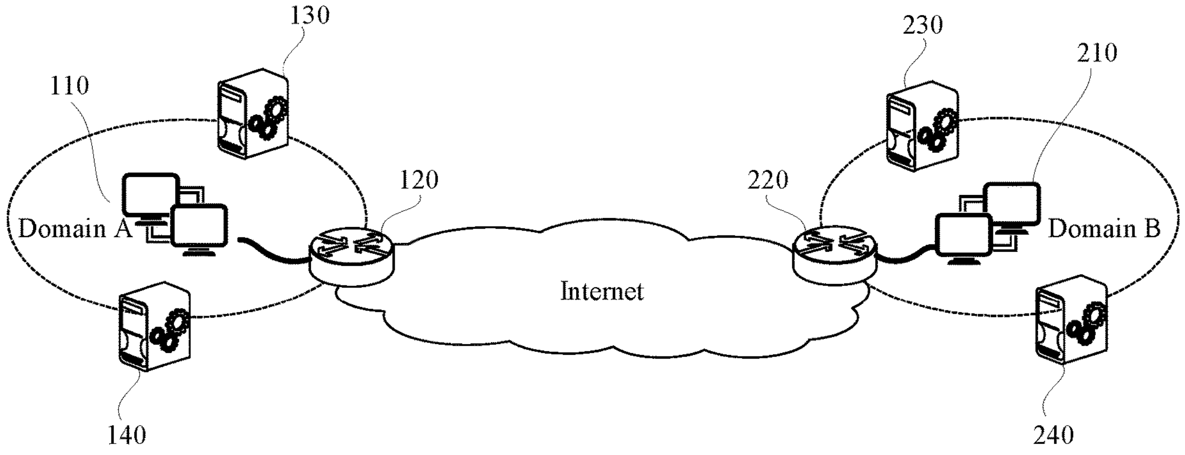
FIG. 2 is a schematic diagram of a network architecture from a client to a server according to another embodiment of the present disclosure.

As shown in FIG. 2, in some embodiments, the domain A may further include a first identity manager 140, and the domain B may further include a second identity manager 240. The first identity manager 140 may be arranged independently, or may be arranged in the same apparatus as the first gateway 120 or the first service controller 130. The second identity manager 240 may be arranged independently, or may be arranged in the same apparatus as the second gateway 220 or the second service controller 230.

Figure 3:
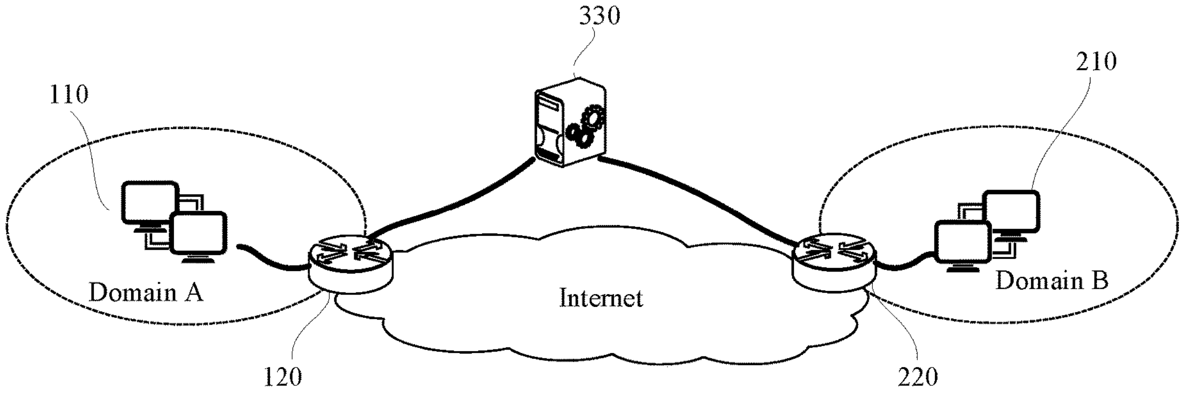
FIG. 3 is a schematic diagram of a network architecture from a client to a server according to another embodiment of the present disclosure.

As shown in FIG. 3, in some other embodiments, the first service controller 130 of the domain A and the second service controller 230 of the domain B may be deployed as one service controller, i.e., the domain A and the domain B employ the same service controller.

Identifiers involved in the network communication or service processing process in FIG. 1 to FIG. 3 are described as follows.

User Identifier (UID): It represents a user identity used by an electronic device (host, which may be a client or a server) to access a network, including, for example, a user name, a mobile phone number, etc.

Network Identifier (NID): It represents an identity of a terminal on a network, can uniquely identify the terminal on the network, and may be in a format of an IP address, an object identifier (OID), etc. For the convenience of distinguishing and description, a client network identifier is denoted as NIDc, and a server network identifier is denoted as NIDs.

Location Identifier (LID): It represents a location of a terminal on a network, and is a routing address identifier of a gateway of a domain where the terminal is located. During inter-domain communication, data is sent to the gateway to which the terminal belongs based on the LID. For the convenience of distinguishing and description, a client location identifier is denoted as LIDc, and a server location identifier is denoted as LIDs.

Service Identifier (SID): It represents a service to be accessed by a client, i.e., a service advertised by the server, including, for example, a domain name, a uniform resource identifier, an application protocol interface identifier, etc. It should be noted that the network identifier NID may also be used as the service identifier SID to support direct communication between hosts using network identifiers.

Apparatuses involved in the network communication or service processing process in FIG. 1 to FIG. 3 are described as follows.

Client 110: It is an initiator of a service or data communication. The data communication includes, but not limited to identity identification, authorization request, service processing, etc. After the client 110 accesses the first gateway 120 and passes an identification and authentication process, the identity manager in a local domain allocates an NIDc to the client. When needing to access a service, the client uses an SID to request an NIDs corresponding to the SID from the service controller, and sends service data to the server based on the NIDs. The identification and authentication process may adopt 802.1x, Extensible Authentication Protocol (EAP), WEB portal, or other identification methods or protocols, which are not within the scope of the present disclosure.

Server 210: It is a peer end of the data communication initiated by the client. Similar to the case with the client, after the server accesses the second gateway 220 and passes an identification and authentication process, the identity manager in the local domain allocates an NIDs to the server, and service registration is performed with the service controller through the second gateway 220. The second gateway 220 registers with the service controller or configures a service at the service controller for the server. When receiving a service request from the client, the server provides a data communication service for the client, for example, provides an NIDs, an LIDs, etc.

Identity manager: It allocates an NID to an electronic device used by the user according to the identified user identity. According to the access technology, the identity manager may be a Dynamic Host Configuration Protocol (DHCP) server or an Authentication, Authorization, Accounting (AAA) server, or may be a function built in a gateway. The specific process is related to the protocol and access technology and is not limited in the present disclosure.

Gateway: According to different access objects, gateways are classified into a first gateway 120 and a second gateway 220. A gateway is an edge device through which a client or server accesses the Internet, and is a node through which the client or server interacts with a peer end of communication, the identity manager, and the service controller. It participates in an NID allocation process, a service advertising process, a service request process, a service processing process, etc., and implements LID management, data communication packet forwarding and access control processes.

Service controller: It manages SID and service access policies, maintains a mapping relationship between SID, NIDs and LIDs of servers, performs service authorization according to a service request from a client, and returns NIDs and LIDs corresponding to the SID. As shown in FIG. 1 and FIG. 2, service controllers may be deployed in a distributed manner, and service controllers may be deployed in different domains and interconnected to form a service control network. As shown in FIG. 3, a centrally deployed service controller may be adopted.

The following description is given in case that the first service controller 130 and the second service controller 230 are deployed centrally, i.e., a centrally deployed service controller is adopted.

The technical schemes of the present disclosure will be described below in conjunction with specific embodiments.

An embodiment of the present disclosure provides a service processing method for identity identification.

Figure 4:
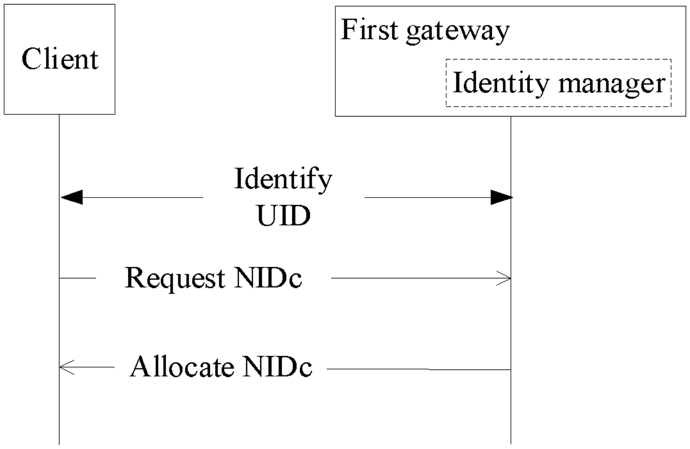
FIG. 4 is a schematic flowchart of a service processing method according to the present disclosure.
Figure 5:
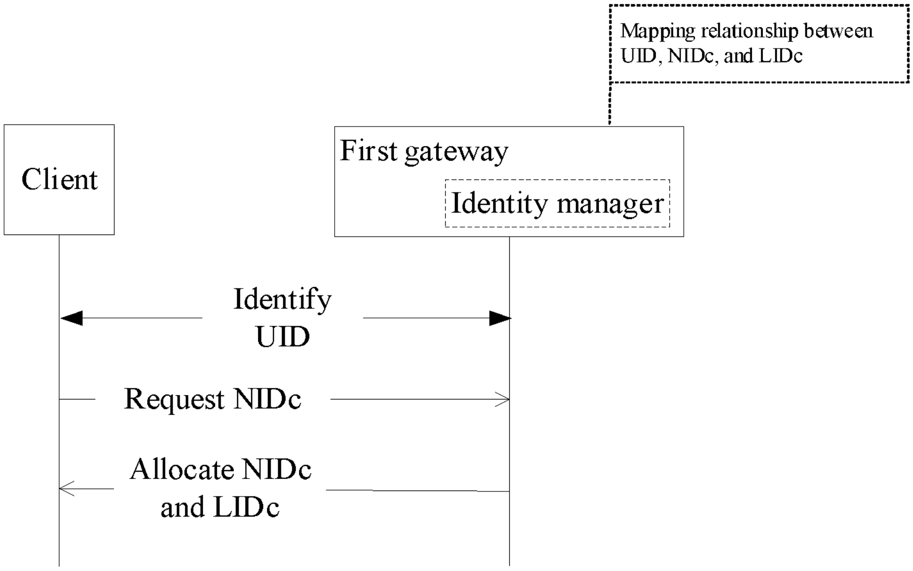
FIG. 5 is a schematic flowchart of another service processing method according to the present disclosure.
Figure 6:
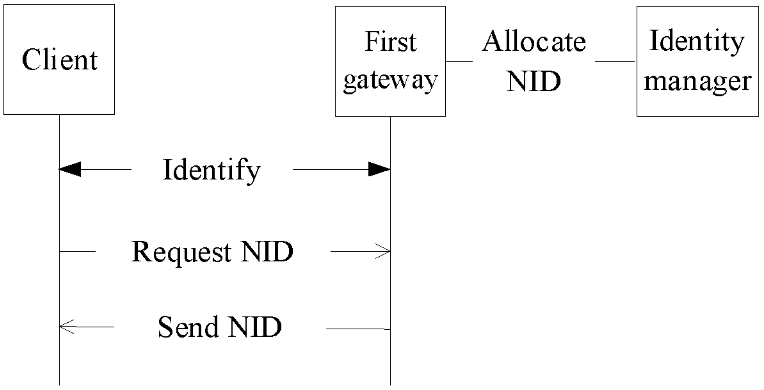
FIG. 6 is a schematic flowchart of another service processing method according to the present disclosure.

FIG. 4 to FIG. 6 are schematic flowcharts of a service processing method for identity identification.

As shown in FIG. 4, the method includes at least the following steps.

The client 110 goes online and request the first gateway 120 to perform identity identification.

After passing the identification, the client 110 sends an NIDc request to the first gateway.

After receiving the request, the first gateway 120 allocates an NIDc to the client 110 and sends the NIDc to the client 110.

The identification process and the NID allocation process may be related to the access technology. For example, in an Ethernet, 802.1x is generally used as the identification technology, and DHCP is generally used in the NID allocation process. In a mobile network, an EAP process is generally adopted for identification, and the NID is allocated when a packet session is established.

In some embodiments, for example, in a network domain corresponding to a data center, the NID may be directly configured for the client through static configuration.

In some embodiments, the client 110 interacts with an identification system through the first gateway 120 for identity identification.

As shown in FIG. 6, in some embodiments, the client 110 requests an NIDc from an identity manager through the first gateway 120, and after receiving the request, the identity manager sends the NIDc to the client 110.

The NID can uniquely represent the client 110 in the network. The identity manager may allocate the NID according to a policy, for example, may allocate a long-term fixed NID according to the UID to facilitate tracking and tracing; or may allocate a periodically changing NID to hide the user's identity; or allocate, according to the location (LIDc) of the client, an NID having a certain relationship with the network access location.

In some embodiments, the first gateway 120 records the identified UID. The UID may be carried by the client 110 and sent to the first gateway. If the UID is not carried when the client 110 requests the NIDc, the UID may be further added by the first gateway.

As shown in FIG. 5, in some embodiments, the first gateway 120 may also allocate an LIDc to the client 110. After configuring the LIDc, the first gateway 120 may or may not send the LIDc to the client 110, depending on the processing capability of the client.

As shown in FIG. 5, in some other embodiments, the first gateway 120 establishes a mapping relationship between the UID, the NIDc, and the LIDc.

In some other embodiments, to further improve the network security and prevent other electronic devices from finding the client or user based on the NIDc, the first gateway 120 may further convert a real NIDc into a virtual NIDc. In this way, other electronic devices cannot find the real network identifier or other privacy information of the client even if acquiring the virtual NIDc. The virtual NIDc may be generated according to a policy, an algorithm, or a rule or at random. Because only the first gateway 120 knows the relationship between the real NIDc and the virtual NIDc and all inter-domain communications require the participation of the gateway, this embodiment can reduce the security risks for the client while ensuring normal network communication.

In some other embodiments, to further improve the network security and prevent other electronic devices from finding the client or user based on the NIDc, the first gateway 120 may also adopt a dynamic NIDc. In this way, even if another electronic device acquires a real NIDc at a previous moment, the real NIDc at the previous moment does not match a new NIDc obtained after dynamic adjustment, thereby protecting the communication security of the client.

The service processing method is also applicable to the server side. As shown in FIG. 3, the server 210 performs identity identification and requests an NIDs through the second gateway 220. In addition, the server 210 further advertises service information including an SID and the NIDs to the service controller 330 through the second gateway 220. The service controller pre-stores the NIDs corresponding to the SID for subsequent service processing.

In some embodiments, the server 210 advertises service information including the SID, the NIDs, and an LIDs to the service controller 330 through the second gateway 220. The service controller 330 pre-stores the NIDs and the LIDs corresponding to the SID for subsequent service processing.

In some embodiments, after recording a correspondence between the SID, the NIDs, and the LIDs, the server controller 330 advertises a service information response to the server 210 through the second gateway 220.

In some embodiments, depending on the capability of the server or the gateway, the service information advertising process may be performed by the server, or a configuration may be made on the gateway such that the gateway advertises the service information for the server after the server goes online, or the service information may be directly configured on the service controller.

The SID represents a service that the server can provide, and may be an NID of the server (indicating that the host supports direct access from other hosts using the NID), a domain name of the host, an Internet of Things (IoT) terminal identifier (e.g., OID), a service (e.g., a file transfer service) loaded by the host, or a uniform resource name (e.g., URN) managed by the host.

In some embodiments, one SID may correspond to multiple hosts, i.e., multiple NIDs, to support a distributed deployment of services.

An NID of a server is advertised as a service, indicating that a host of the server allows direct access from other hosts using the NID. This not only can support the habit or service of direct access using an IP address on the Internet, but also can provide an access control capability.

An embodiment of the present disclosure provides a service processing method for service authorization and access.

Figure 7:
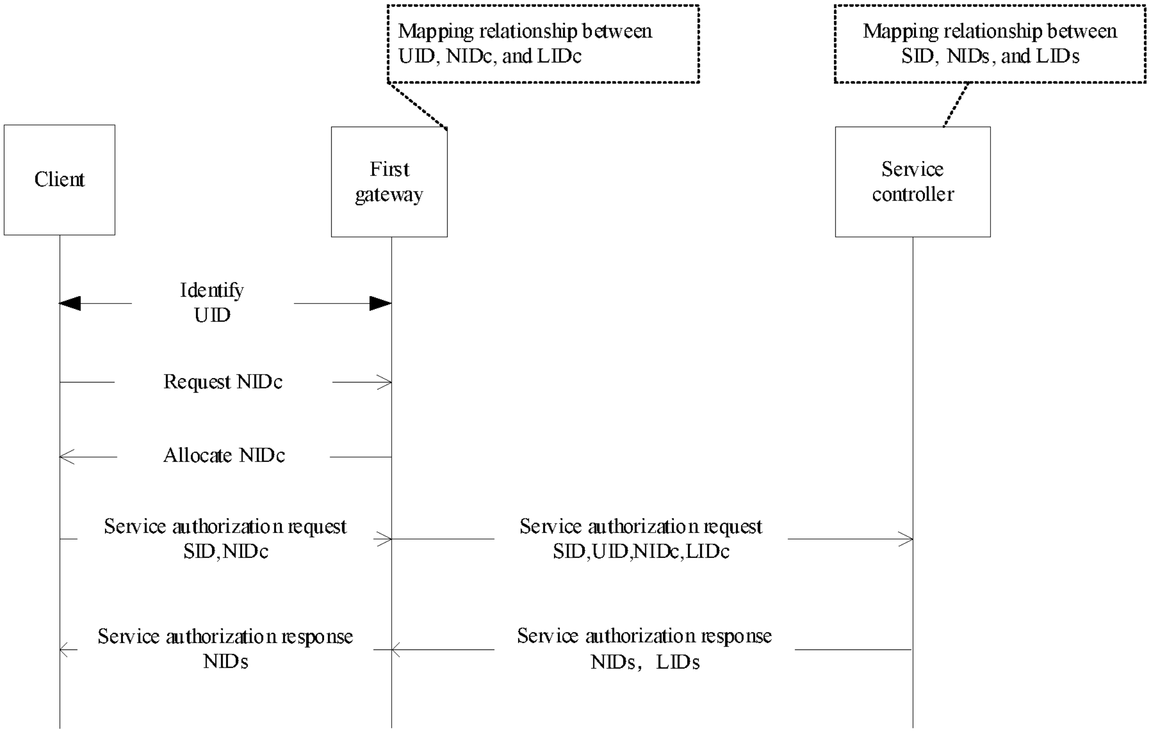
FIG. 7 is a schematic flowchart of a service processing method according to the present disclosure.
Figure 8:
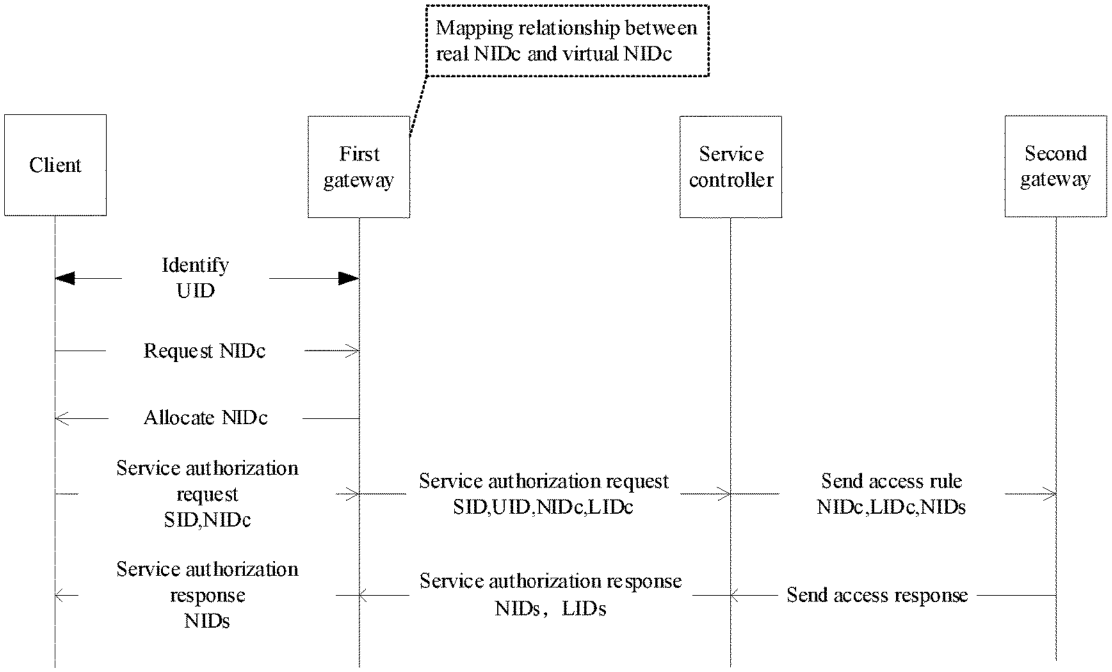
FIG. 8 is a schematic flowchart of another service processing method according to the present disclosure.

FIG. 7 to FIG. 8 are schematic flowcharts of a service processing method for service authorization and access. This process includes the above service processing method for identity identification. In other words, both the client and the server have been identified. The contents disclosed in the above embodiments, such as the advertising of the SID by the server, also apply to the service processing method of this embodiment, and the details will not be repeated here.

As shown in FIG. 7, the method includes at least the following steps.

The client sends a service authorization request to the first gateway, where the service authorization request carries an SID and an NIDc.

The first gateway resolves the service authorization request and further adds a UID and an LIDc.

The first gateway forwards the service resolution request to the service controller, where the request includes at least the SID, the UID, the NIDc, and the LIDc. In some embodiments, the request further includes a user attribute, such as a device type, a system type, a physical location, etc. In some embodiments, the NIDc may further carry information about a communication port to be used by the client.

The service controller determines, according to the service resolution request, whether to allow this access, i.e., execute service access authorization; and if allowing to authorize the access, returns a service resolution response to the first gateway. The response includes a resolution result. The resolution result may further include an NIDs and an LIDs corresponding to the SID. In some embodiments, the resolution result may further include a validity period or a server communication port.

The first gateway sends the service authorization response (service resolution response) to the client, and saves the resolution result for subsequent forwarding of service data.

The client receives the service authorization response carrying the NIDs. In some embodiments, the response may further carry a validity period.

As shown in FIG. 8, in some embodiments, if the service controller allows to authorize the access, the service controller selects the corresponding second gateway, and delivers an access rule to the selected second gateway, where the rule includes at least the NIDc, the LIDc, and the NIDs. The second gateway saves the access rule and sends an access response to the service controller. In some embodiments, the rule may further include information such as the LIDs or a validity period. With the setting of the validity period, the client is allowed to perform corresponding service processing only within the validity period. The rule corresponds to a forwarding table of a network layer. Subsequently, the second gateway executes a service data forwarding process according to the saved forwarding table.

In some embodiments, the first gateway establishes the same rule table as that of the second gateway. The rule table includes the NIDc, the LIDc, the NIDs, and the LIDs, and may further include communication port information of the client and the server.

As shown in FIG. 8, to further improve the network security on the client side, in some embodiments, before the first gateway forwards the service resolution request to the service controller, the first gateway may convert the real NIDc into a virtual NIDc according to a specific rule or at random, and then send the virtual NIDc to the service controller.

In some other embodiments, the first gateway sets a dynamic NIDc to protect the identity information of the client.

An embodiment of the present disclosure provides a service processing method for sending and receiving service data.

Figure 9:
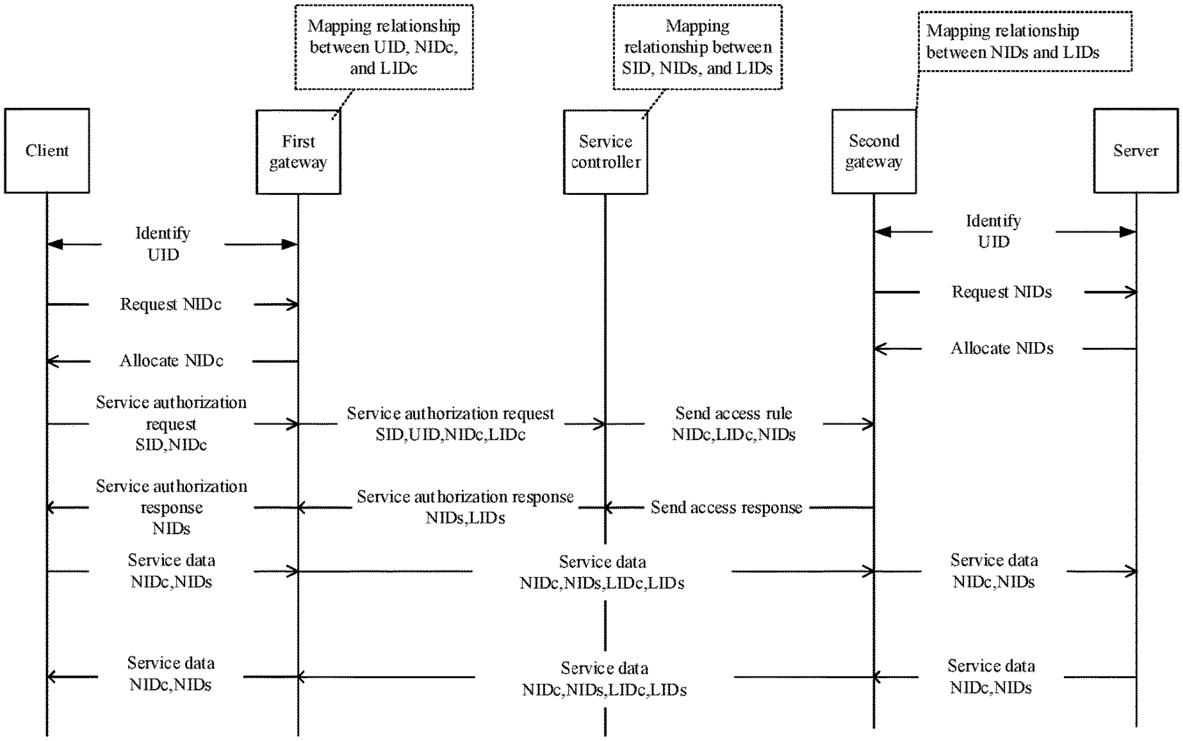
FIG. 9 is a schematic flowchart of a service processing method according to the present disclosure.
Figure 10:
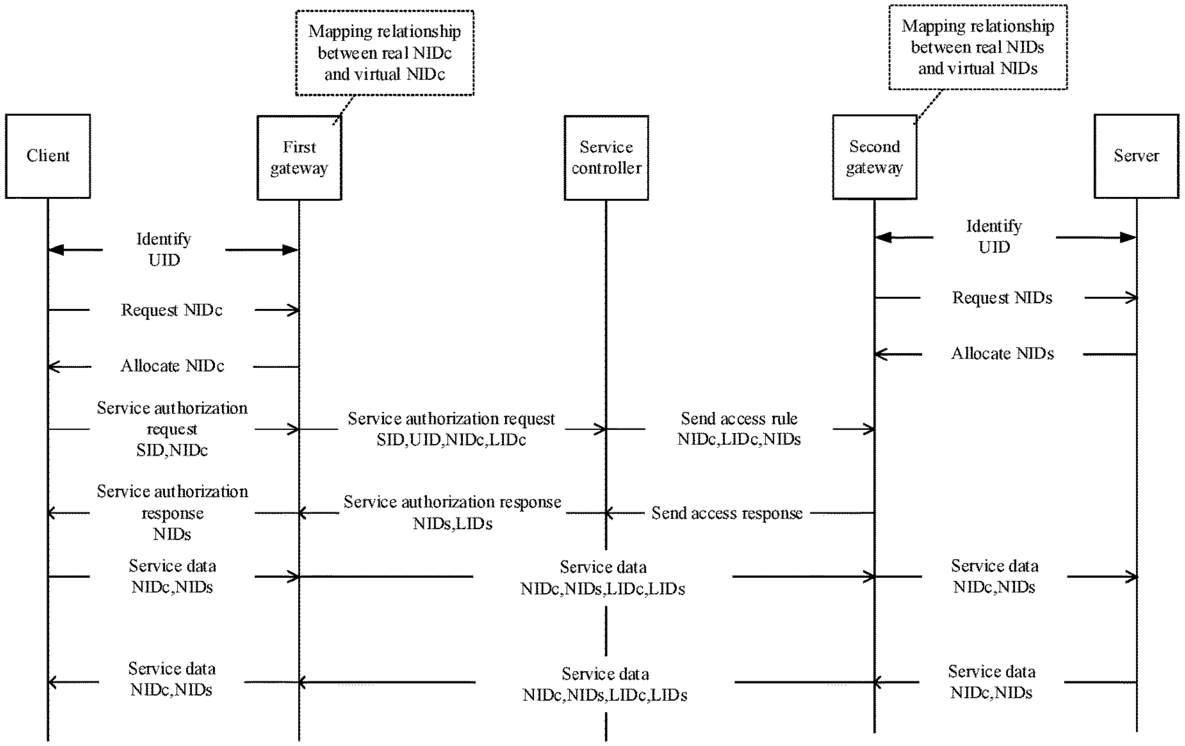
FIG. 10 is a schematic flowchart of another service processing method according to the present disclosure.
Figure 11:
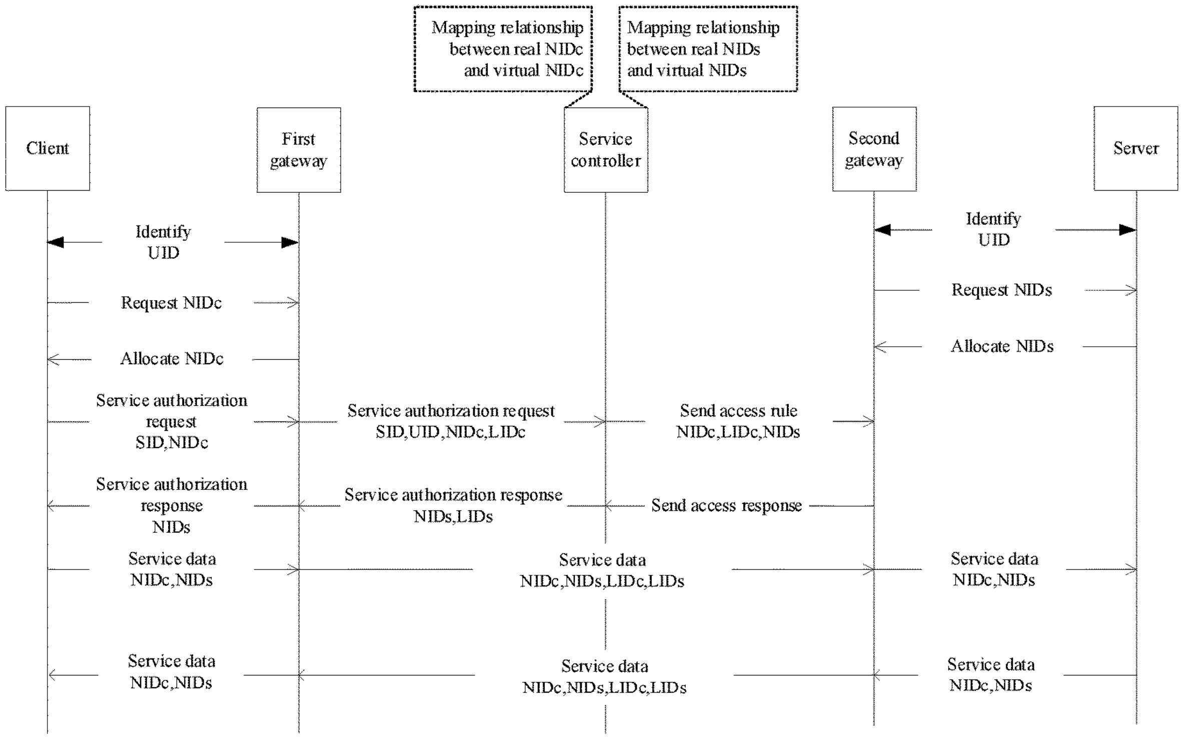
FIG. 11 is a schematic flowchart of another service processing method according to the present disclosure.

FIG. 9 to FIG. 11 are schematic flowcharts of a service processing method for sending service data. This process includes the above service processing method for identity identification and the above service processing method for service authorization and access. The contents disclosed in the above embodiments are also applicable to the service processing method of this embodiment, and the details will not be repeated here.

As shown in FIG. 9, the method includes at least the following steps.

The client sends a service data packet to the first gateway.

In a specific process, the client sends the service data packet to the corresponding NIDs in the service authorization response. A source NID of the service data packet is the NIDc, and a destination NID of the service data packet is the NIDs. The client sends service data carrying the NIDc and the NIDs to the first gateway.

Depending on a particular service, communication port information may further be included. A destination communication port is a communication port specified in the resolution response or a default communication port, and a source communication port is a communication port set in the resolution request or a communication port selected by the client.

The first gateway sends the service data packet carrying the NIDc, the LIDc, the NIDs, and the LIDs to the second gateway.

In a specific process, the first gateway queries for the corresponding LIDs according to the NIDc and the NIDs; and if a correspondence is found, indicating that the access is authorized, encapsulates the data packet. To be specific, the first gateway encapsulates the data packet using the LIDc as a source address and the LIDs as a destination address, and then forwards the encapsulated data packet to the second gateway according to the LIDs. Because only an authorized access has an access relationship, service access control is achieved at the first gateway. In other words, the method of this embodiment not only can improve the network security, but also can better implement the control and management of service access on the client side.

In some embodiments, the first gateway may further generate a session forwarding table based on the rule table, where the session forwarding table includes NIDc, NIDs, client communication port, server port, LIDc, and LIDs; maintain a session; and directly forward a subsequent packet according to the session forwarding table.

After receiving the data packet, the second gateway sends the service data packet to the server according to the NIDc and the NIDs.

In a specific process, after receiving the data packet, the second gateway searches for a local rule according to the LIDc, the NIDc, the NIDs, and the LIDs; and if a match is found, removes the LIDc and the LIDs, and then forwards the data packet to the server according to the NIDc and the NIDs. Because only an authorized access has a rule table, service access control is implemented on the second gateway side. In other words, the method of this embodiment not only can improve the network security, but also can better implement the control and management of service access on the service side.

In some embodiments, the second gateway may further generate a session forwarding table based on the rule table, where the session forwarding table includes NIDc, NIDs, client communication port, server port, LIDc, and LIDs; maintain a session; and directly forward a subsequent packet according to the session forwarding table.

The server returns a responded data packet to the client.

In a specific process, a source NID of the responded service data packet is NIDs, and a destination NID of the responded service data packet is NIDc; and the server send service data carrying the NIDc and the NIDs to the second gateway.

The second gateway sends the service data packet carrying the NIDc, the LIDc, the NIDs, and the LIDs to the first gateway.

In a specific process, the second gateway queries for an LIDc corresponding to the NIDc; and if a correspondence is found, encapsulates the data packet, for example, by using the LIDs as a source address and the LIDc as a destination address, and then forwards the encapsulated data packet to the first gateway according to the LIDc.

The first gateway sends the service data packet to the client.

In a specific process, after receiving the data packet, the first gateway searches for a local rule according to the LIDc, the NIDc, the LIDs, and the NIDs; and if a match is found, removes the LIDc and the LIDs, and then forwards the data packet to the client according to the NIDc and the NIDs.

Through the above process, SID-based service access, data packet forwarding and control are realized. This not only improves the network security, but also better realizes the control and management of service access.

In some embodiments, a validity period is further included. The validity period indicates a validity period of the service resolution result. If the validity period expires, the client needs to request a service again.

Because both the first gateway and the second gateway are capable of executing the policy, both or either of the first gateway and the second gateway may execute the policy or rule depending on the specific deployment. Different service resolution protocols may be adopted depending on different services. For example, the DNS protocol is used for a domain name service, and the OID resolution protocol is used for an IoT application.

As shown in FIG. 10, to further improve the network security on the client side, in some embodiments, before the first gateway forwards the service data packet to the service controller, the first gateway may convert the real NIDc into a virtual NIDc according to a specific rule or at random, and then send the virtual NIDc to the server.

Figure 12:
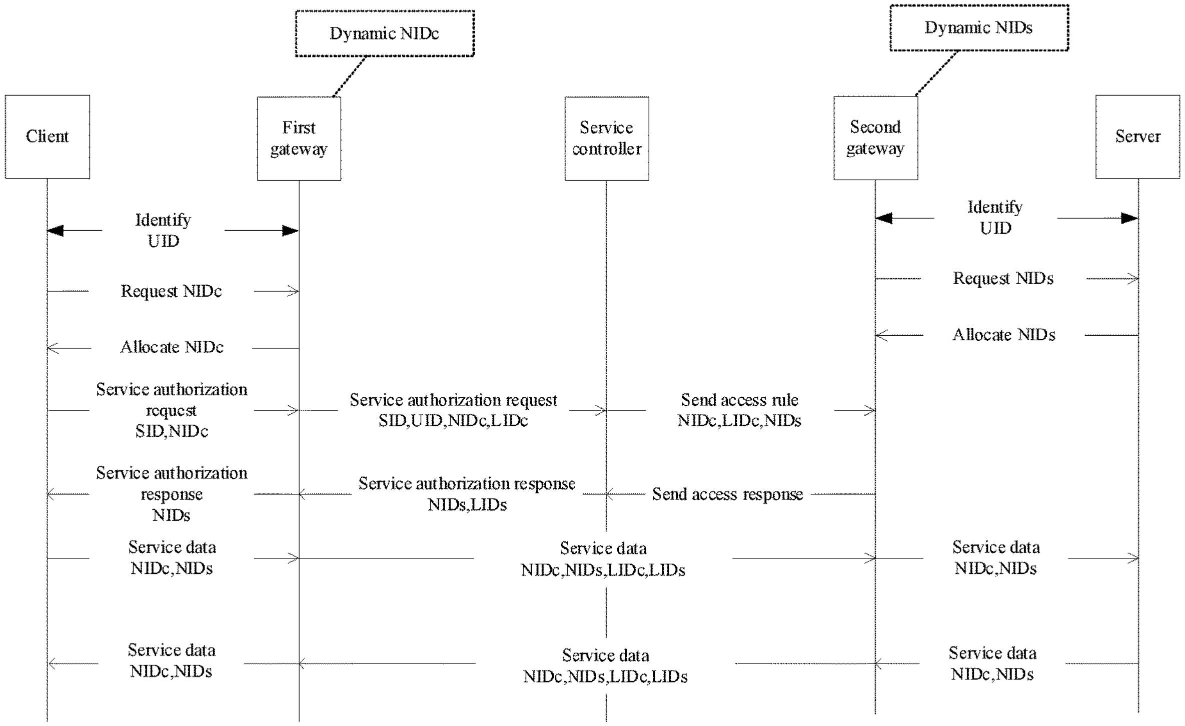
FIG. 12 is a schematic flowchart of another service processing method according to the present disclosure.

As shown in FIG. 12, in some other embodiments, the first gateway sets a dynamic NIDc to protect the identity information of the client.

Similarly, in some embodiments, before the second gateway sends the service data packet to the server, the second gateway may convert the received NIDs (virtual NIDs) into a real NIDs according to a mapping relationship between the virtual NIDs and the real NIDs, and then sends the service data packet to the server.

As shown in FIG. 12, in some other embodiments, the second gateway sets a dynamic NIDc to protect the identity information of the client.

As shown in FIG. 11, to further improve the network security on the client side, in some embodiments, the server controller may further establish a mapping relationship between a real NIDc and a virtual NIDc and a mapping relationship between a real NIDs and a virtual NIDs in the process of service authorization and access, before data communication is performed.

An embodiment of the present disclosure provides a service processing method for domain name-based service authorization and access.

Figure 13:
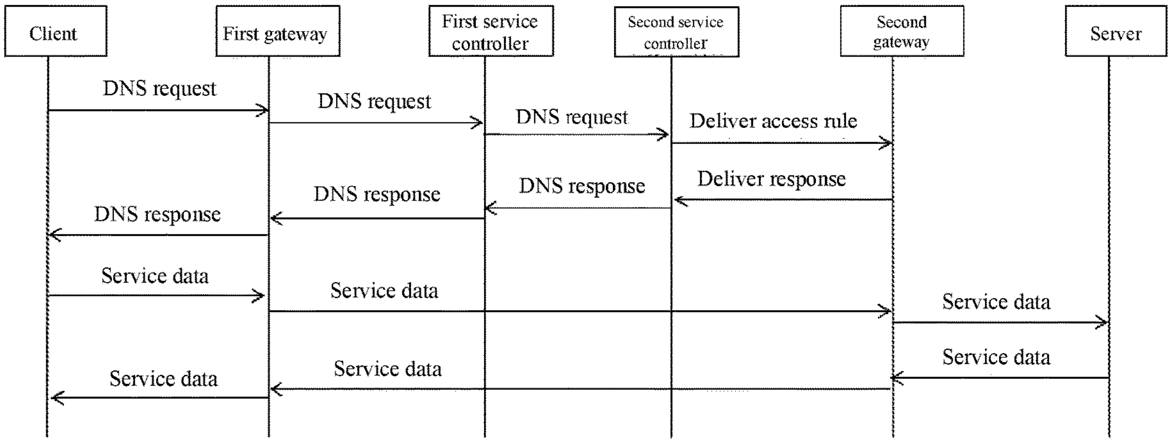
FIG. 13 is a schematic flowchart of a service processing method according to the present disclosure.

FIG. 13 is a schematic flowchart of domain name-based service authorization and access according to an embodiment of the present disclosure. In this embodiment, the SID is a domain name (e.g., www.example.com), and the service resolution protocol is, for example, the DNS resolution protocol and an extension thereof.

In this case, a service controller in an access domain (a first service controller) acts as a local DNS server, a service controller in a destination domain (a second service controller) acts as an authoritative DNS server, a first gateway acts as a DNS cache or proxy, and a client configures an IP address of a domain name server as the local DNS server.

The client sends a DNS resolution request carrying a domain name of a server to be accessed to the first service controller through the first gateway.

The first gateway forwards the DNS resolution request to the first service controller, and further extends the DNS protocol to carry information such as a UID, a client NID, a client LID, and a user attribute.

The first service controller sends a DNS resolution request to the second service controller responsible for the domain name according to the domain name through a DNS resolution system, where the resolution request may adopt the DNS protocol or a general service resolution protocol.

The second service controller executes service access authorization, selects a second gateway, and delivers an access rule according to the information such as the client UID, the client LID, and user attribute, the domain name of the server to be accessed, and an access policy.

The second gateway saves the access rule and returns a response to the second service controller, where the response carries an NID corresponding to the domain name, and carries an LID through protocol extension.

The second service controller returns a DNS resolution response carrying the NID and the LID corresponding to the domain name to the first service controller.

The first service controller sends the DNS resolution response to the client DNS through the first gateway.

The first gateway sends the DNS resolution response to the client and saves a resolution result which carries at least the NID.

The client sends service data carrying at least the NID of the destination domain to the first gateway.

The first gateway sends the service data carrying at least the NID and the LID of the access domain and the destination domain to the second gateway.

The second gateway sends the service data carrying at least the NID of the access domain and the destination domain to the server.

The server sends the service data carrying at least the NID of the access domain and the destination domain to the second gateway.

The second gateway sends the service data carrying at least the NID and the LID of the access domain and the destination domain to the first gateway.

The first gateway sends the service data carrying at least the NID of the access domain and the destination domain to the client.

An embodiment of the present disclosure provides a service processing apparatus, configured for identity identification. The apparatus includes:

an electronic device, a gateway, and an identity manager.

The electronic device is configured for sending an identification request to the gateway based on a user identifier UID and sending a network identifier NID to the gateway after the identification.

The gateway is configured for identifying the electronic device and sending the network identifier NID to the electronic device.

The identity manager is configured for allocating the network identifier NID to the electronic device.

The user identifier UID is a user identity used by the electronic device to access a network.

An embodiment of the present disclosure provides a service processing apparatus, configured for processing a service request. The apparatus includes:

a client, a first gateway, and a service controller.

The client is configured for sending a service authorization request carrying a service identifier SID and a client network identifier NIDc to the first gateway.

The first gateway is configured for configuring a client location identifier LID for the client, and forwarding the service authorization request carrying the service identifier SID, the client network identifier NID, and the client location identifier LID to the service controller.

The service controller is configured for returning a service authorization response based on the service authorization request.

The service authorization response carries a server network identifier NID and a server location identifier LID.

An embodiment of the present disclosure provides a service processing apparatus, configured for processing a service request. The apparatus includes:

a client, a first gateway, a second gateway, and a server.

The client is configured for sending service data carrying a client network identifier NID and a server network identifier NID to the first gateway.

The first gateway is configured for forwarding the service data carrying the client network identifier NID, a client location identifier LID, the server network identifier NID, and a server location identifier LID to the second gateway.

The second gateway is configured for forwarding the service data carrying the client network identifier NID and the server network identifier NID to the server.

The server is configured for receiving the service data and sending responded service data to the client through the second gateway and the first gateway.

In the service processing method provided in the embodiments of the present disclosure, network communication such as network identification, service authorization, and service processing is performed by separating network identifiers and location identifiers of the client and the server and establishing a mapping relationship between the network identifiers and the location identifiers of the client and the server. In this way, the network service is easier to manage and control, and security risks caused by the easy analysis and recognition of the locations and identifiers of the client and the server can be avoided. This further improves the network security, and makes the network service easier to manage and control.

Those having ordinary skills in the art can understand that all or some of the steps in the methods disclosed above and the functional modules/units in the system and the apparatus can be implemented as software, firmware, hardware, and appropriate combinations thereof.

In a hardware implementation, the division of the functional modules/units mentioned in the above description does not necessarily correspond to the division of physical components. For example, one physical component may have multiple functions, or one function or step may be jointly executed by several physical components. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer readable instructions, data structures, program modules, or other data). The computer storage medium includes, but is not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some embodiments of the present disclosure are described above with reference to the accompanying drawings, these embodiments are not intended to limit the protection scope of the present disclosure. Any modifications, equivalent replacements and improvements made by those having ordinary skills in the art without departing from the scope and essence of the present disclosure shall fall within the protection scope of the present disclosure.

What is claimed is:

1. A service processing method, comprising:

sending an identity authentication request carrying a user identifier;

requesting a first client network identifier;

receiving the first client network identifier;

sending a service authorization request carrying a service identifier and the first client network identifier;

receiving a service authorization response carrying a first server network identifier;

sending service data carrying the first client network identifier and the first server network identifier (NIDs);

receiving responded service data;

generating, by the first gateway, a first session forwarding table comprising the first client network identifier, the first client network identifier, a client communication port, a server port, the client location identifier, and the server location identifier;

maintaining, by the first gateway, a session; and directly forwarding, by the first gateway, a subsequent packet according to the first session forwarding table;

wherein sending service data carrying the first client network identifier and the first server network identifier comprises:

sending the service data carrying the first client network identifier and the first server network identifier to a first gateway;

converting, by the first gateway, the first client network identifier into a second client network identifier, the second client network identifier being one of a virtual network identifier or a dynamic network identifier, and the first client network identifier and the second client network identifier are both Internet Protocol (IP) address; and sending, by the first gateway, the service data carrying the second client network identifier, a client location identifier, the first server network identifier, and a server location identifier to a second gateway; and sending, by the second gateway, a service data packet carrying the second client network identifier and the first server network identifier to a server.

2. The service processing method of claim 1, wherein receiving responded service data comprises:

sending, by the server, the responded service data carrying the first client network identifier and the first server network identifier to the second gateway;

sending, by the second gateway, the responded service data carrying the first client network identifier, the client location identifier, the first server network identifier, and the server location identifier to the first gateway;

sending, by the first gateway, the responded service data carrying the first client network identifier and the first server network identifier to a client; and receiving responded service data from the server.

3. The service processing method of claim 1, wherein sending service data carrying the first client network identifier and the first server network identifier comprises:

sending the service data carrying the first client network identifier and the first server network identifier to the first gateway;

sending, by the first gateway, the service data carrying the first client network identifier, the client location identifier, the first server network identifier, and the server location identifier to the second gateway;

converting, by the second gateway, the first server network identifier into a second server network identifier; and sending, by the second gateway, a service data packet carrying the first client network identifier and the second server network identifier to the server.

4. An electronic device, comprising a memory, a processor, and a computer program stored in the memory and executable by the processor, wherein the computer program, when executed by the processor, causes the processor to perform:

the service processing method of claim 1.

5. A non-transitory computer-readable storage medium, the storage medium storing at least one program which, when executed by at least one processor, cause the at least one processor to perform the service processing method of claim 1.

6. The service processing method of claim 1, wherein the first client network identifier is one of a periodically changing NID, or an NID having a relationship with a network access location.

7. The service processing method of claim 1, wherein the second client network identifier is a virtual network identifier, which is generated according to a policy, an algorithm, or a rule or at random.

8. The service processing method of claim 1, further comprising:

generating, by the second gateway, a first session forwarding table comprising the first client network identifier, the first client network identifier, a client communication port, a server port, the client location identifier, and the server location identifier;

maintaining, by the second gateway, a session; and directly forwarding, by the second gateway, a subsequent packet according to the first session forwarding table.

* * * * *